Jan. 1, 1963  C. G. DE HAVEN ET AL  3,070,836
METHOD AND APPARATUS FOR AUTOMATIC CONTROL OF AN EXTRUDER
Filed July 9, 1959  2 Sheets-Sheet 1
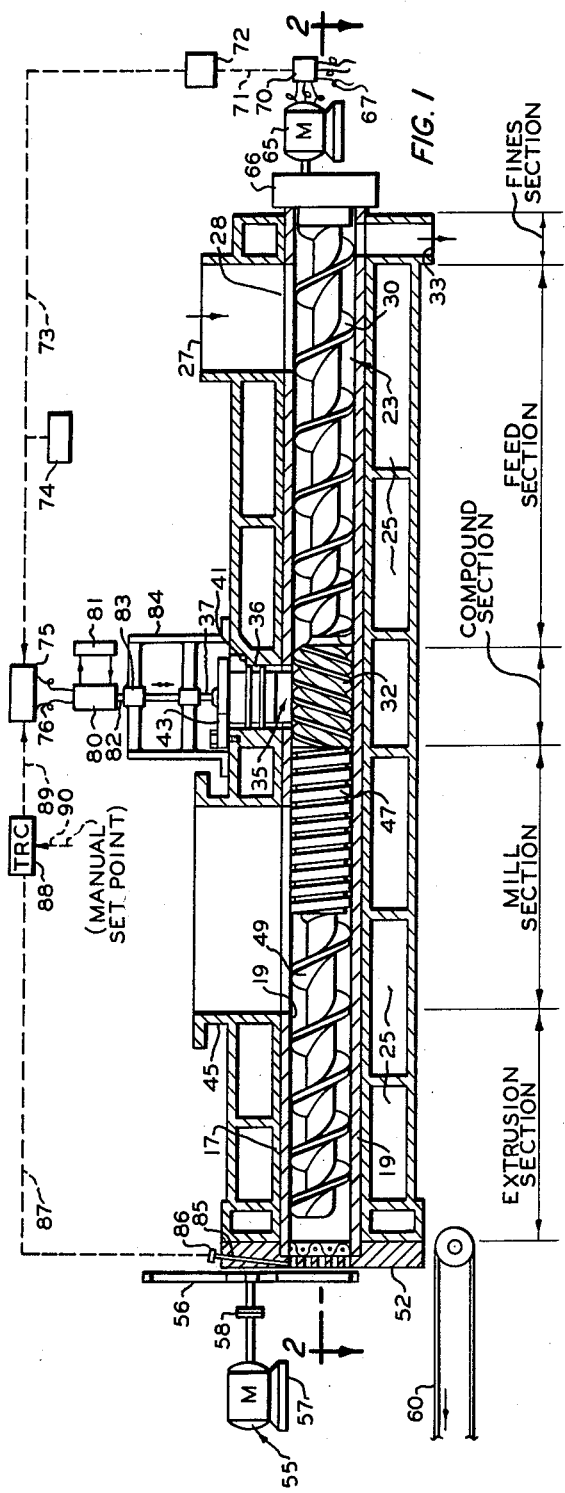
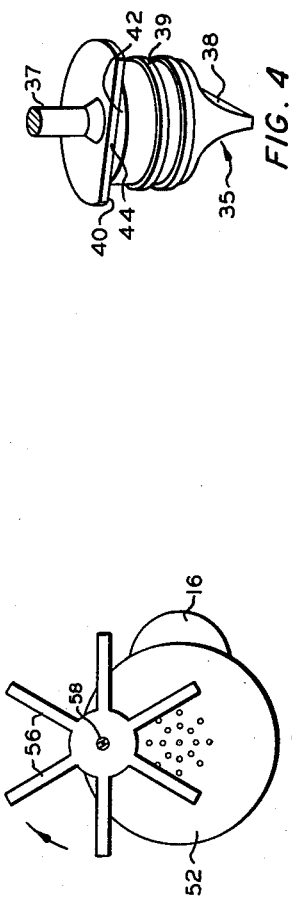
INVENTORS
C.G. DE HAVEN
D.E. BERGER
BY Hudson and Young
ATTORNEYS

INVENTORS
C.G. DE HAVEN
D.E. BERGER

BY *Hudson and Young*

ATTORNEYS

United States Patent Office 3,070,836
Patented Jan. 1, 1963

3,070,836
METHOD AND APPARATUS FOR AUTOMATIC CONTROL OF AN EXTRUDER
Clark G. De Haven and Donald E. Berger, Bartlesville, Okla., assignors to Phillips Petroleum Company, a corporation of Delaware
Filed July 9, 1959, Ser. No. 825,952
15 Claims. (Cl. 18—2)

This invention relates to an improved method and apparatus for milling or mechanically working a plastic or a plasticized material.

A highly successful method of drying and removing volatiles (i.e. volatile matter) from synthetic rubber or other plastic compounds is by masticating the material in equipment employing rotating screws with flights of varying pitch and opposite pitch so that high pressures and temperatures are developed within the material by internal friction. In such equipment water is squeezed from the material being processed and following the severe mastication the pressure is suddenly reduced so that the heat produced in working the material vaporizes the remaining moisture and volatiles. Equipment of this type, called an extrusion dryer, is manufactured by Welding Engineers, Incorporated, Morristown, Pennsylvania, and is fully described in the reissue patent of Lawrence J. Fuller, Re. 23,948, reissued February 15, 1955.

For example, when processing emulsion polymerized coagulum (e.g. of rubber), a slurry of the polymer is passed over a screen or through squeeze rolls to remove some of the water to produce a mixture of about 65 percent rubber and 35 percent water (percents by weight of the mixture). The wet coagulum is dropped into the feed screws of the extrusion dryer. The material is compressed or squeezed in the feed section of this dryer to produce, for example, a mixture containing about 80–95 percent by weight of the rubber polymer. The polymer is then forced into the following sections of the dryer barrel where the mastication referred to above takes place and the residual moisture is evaporated. It is desired that the finished product of rubber contain about one-half percent or less of moisture.

Moisture and other volatiles in the product may affect further fabricating processes and therefore control of their concentrations is important. For example, if too much water is present in a rubber that is intended for use in the manufacture of tires, blisters will be formed within the rubber in the process of manufacturing the tires. These blisters cause defective tires and increase the expense of manufacture thereof. It is therefore important for this reason and for many others that the volatiles content, and particularly the water content, of materials such as natural or synthetic rubber be held to a safe low limit, on the order of one half of one percent of moisture. While this would appear to call for a drying process, the drying is limited in that the temperature cannot be too high, since too high a temperature would cause deterioration of the product, especially if it is a natural rubber, synthetic rubber, or a mixture of these.

Because of this temperature limitation, equipment employing rotating screws, such as broadly described above, is employed so that a high pressure can be developed in one part of the machine and a sudden change to a low pressure can be effected in order to flash vaporize the moisture and other volatiles. The effect of temperature, of course, is still as it would be in any dryer in that it serves to vaporize the moisture and volatiles.

We have discovered that the amount of moisture and volatiles in the product from an extruder-dryer (extrudate) such as that described in said patent to Fuller is correlated (1) with the mechanical work applied to the rubber in the extruder and (2) with the temperature of the product from such apparatus. Accordingly, we propose to control the operation of an extruder dryer or similar apparatus in accordance with the power consumed thereby in masticating the rubber and also in accordance with the temperature of the extrudate with the end in mind of controlling the properties of the product, particularly the properties of moisture and other volatiles content. This we propose to do my measuring the power input to such apparatus and then controlling the adjustment of a constriction or other pressure-building means within the apparatus responsive to such measurement. Further, the method and apparatus of our invention measures the temperature of the extrudate to exert a control adjustment on such pressure-building means in response to the temperature.

It is an object of our invention to provide an improved method and apparatus for the milling or mechanical working of the plastic or plasticized material. It is another object of our invention to provide a method and apparatus for controlling the milling or mechanical working of such materials. In a more specific object, we have in mind the automatic controlling of the mechanical working or milling of such materials, and in particular the working of natural and synthetic rubbers. A further object is to provide a method and apparatus for automatically controlling the mechanical working of natural and synthetic rubber in a worm screw type of extruder dryer that works such rubber materials under pressure and temperature.

While we have recited above and will further recite below, various objects, advantages, and features, it is not our intention to be limited to the specific embodiments taught herein. Moreover, other objects, advantages, and features than those recited above should become apparent from the following disclosure.

In the drawings:

FIGURE 1 is an assembly showing details of the extrusion apparatus in section 1—1 through the casing of FIGURE 2 and a schematic arrangement of the controls of our invention;

Figure 5:
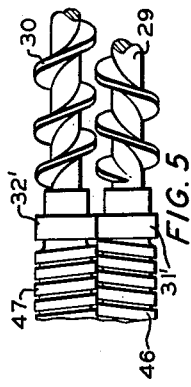

FIGURE 3 comprises an end view of the pelletizing unit of FIGURE 1;

FIGURE 4 shows details of the pressure block structure;

FIGURE 5 is another embodiment of the compounding section of the screws.

Throughout the drawings the same number represents the same element.

While a number of plastic materials can be worked in an extrusion dryer as described herein, the advantages particularly accompany the processing of rubbery coagulum produced in emulsion polymerization processes for synthetic rubber. Coagulum of natural rubber latex can also be processed advantageously by our invention. The synthetic rubbers which are preferred for processing in our invention are the butadiene-styrene copolymers, the butadiene-acrylonitrile copolymers, the butadiene-methyl vinyl pyridine copolymers, polybutadiene, poly isoprene, polychloroprene, and the like. One process for the manufacture and recovery of rubber polymers from a latex is described in U.S. Patent 2,615,010 to J. E. Troyan. So far as our invntion is suitable for processing rubbers, it is proposed that an apparatus such as that of Fuller in combination with our invention be employed for drying such rubber polymers. Further, our invention constitutes an improvement that can be substituted for the conventional oven-type dryers, such as that shown in Troyan, for example. For the sake of simplicity in the following disclosure it will be assumed that a synthetic rubber is being treated, but it is to be understood that such assumption is by no way a limitation on our invention.

Figure 2:
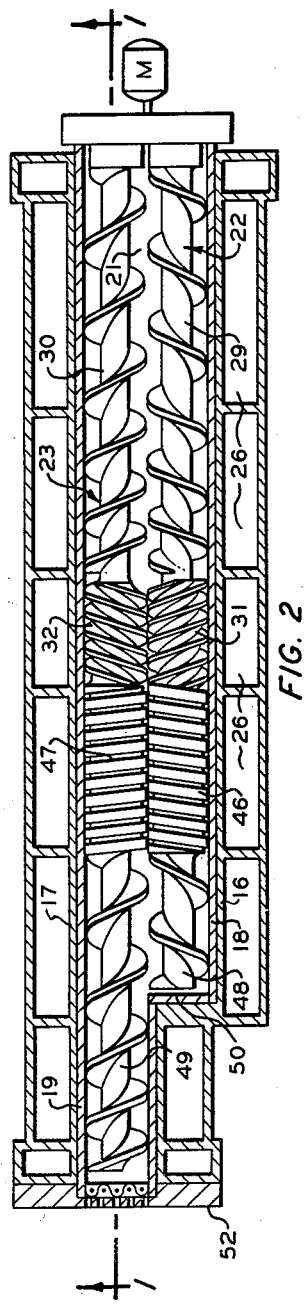
FIGURE 2 is a plan view of the worms through section 2—2 of the casing of FIGURE 1.

In the apparatus of FIGURES 1 and 2 a double barrel 16, 17 is formed preferably of welded plates and is provided with liners 18, 19 meeting as shown in Fuller and leaving a longitudinally extending slot between the worm assemblies at 21. Worm assemblies 22, 23 with opposite pitches to their flights are positioned in barrels 16, 17 respectively and are connected to be driven with opposite rotations so that their peripheries move downwardly together at the center.

Surrounding barrels 16, 17 are jackets 25, 26 for heating or cooling fluids, the jackets being divided into sections to control independently the temperatures of successive portions of the worm feed.

A hopper 27 has a bottom opening 28 feeding material down into the receiving ends of the feed flights 29, 30 of the worm assemblies 22, 23. The feed flights 29, 30 are, respectively, left and right hand and generally helical in form, progressively decreasing in pitch to increase their ability to develop pressure. The axial dimension of the feed flight defines the feed section of the machine.

Back pressure is developed by the compounding sections shown as reverse flight screws 31, 32 to which the material is delivered by the forward flights 29, 30. The parallel substantially adjacent worms 22, 23 thus carry the material forward and force it into the reverse flights 31, 32 which in turn exert a retarding action on the forward movement of the material.

Another construction of the compounding section is shown in FIGURE 5 as 31', 32' as comprising a cylinder with no helices. The cylinder diameter cooperates with the liners 18, 19 and the hereinafter described pressure block to form a constriction having a small radial clearance, or annulus, which pressurizes rubber received from the feed section.

The root diameter of the flights 31 and 32 is considerably larger than the root diameter of flights 22 and 23. This, as does the structure of FIGURE 5, serves to amplify the pressure-building and squeezing action that takes place in the feed section and in the compound section. The pressures created upstream of the compound section squeeze out liquids which flow counter-current to the feed of the rubber and are removed through the fines section 33.

The structure of the worm in the fines section that we have illustrated shows a continuation of the forward feeding flights of the feed section, rather than the restrictive threaded section shown by Fuller. Either of these structures can be used but we prefer ot use the embodiment shown in FIGURES 1 and 2 of this application.

A further important effect of the action of the feed flights 29, 30 forcing material into and through the compounding section 31, 32 or 31', 32' is the generating of heat within the material itself due to the mechanical working action of the worms creating internal friction within the material. There is no escape for the material except through the reverse flights or cylinder so that the back pressure applied to the material and the heat developed by the internal friction simultaneously act on the material as it is being fed, working the material thoroughly under pressure and internally generated heat.

It is thus very completely mixed and conditioned for extrusion and for release of violatiles if any. This pressurized and heated material, plasticized and thoroughly mixed, is next released to a low pressure region through a constriction formed by the screws and the pressure block 35. The size and degree of constriction is controlled by predetermined regulation of a radial clearance between pressure block 35 and the screw compounding sections (31, 32 or 31', 32') in which the material is confined and by providing for release of the material from the compounding section. By control of this radial clearance any desired degree of working and heating may be attained. The escaping material is either exposed to the atmosphere or to a chamber supplied with a suitable inert gas or maintained under a suitable partial vacuum, any of which are designed to assist the vaporization at this stage.

The radial clearance, in cooperating with the structure of the screws in the compounding section, provides a constriction in the apparatus. As seen in FIGURES 1 and 4, the pressure block 35 is mounted in a guide opening 36 which is integral with the barrels 16 and 17 of the extruder. The pressure block 35 comprises a substantially cylindrical body member, the lower portion of which is contoured to define a cooperating surface 38 for coacting with the worm screws to define the constriction. The body member is also provided with a plurality of circumferentially disposed lands 39 which in turn provide a labyrinth seal between the guide 36 and the pressure block. The labyrinth seal prevents the flow of high-pressure plasticized rubber from the compound section past the pressure block and out through the top of the guide 36. A lower limit stop 40 is defined by the underside of a flanged portion of the body and cooperates with a shoulder 41 which is part of the guide 36 to stop the pressure block at a predetermined lower limit of travel. An upper limit vertical stop surface 42 is formed by machining, as by milling, a portion of the flange and the body away as shown in FIGURE 4. This surface 42 cooperates with a rectangular shaped vertical upper limit stop and twist guide block 43 which is bolted to the guide 36 as seen in FIGURE 1. The block 43 serves to limit the upper travel of the pressure block 35, and it also serves to prevent the pressure block from twisting and causing mechanical interference between the contoured section 38 and the reverse flight sections 32 and 31 of the worm. The limit stops 41 and 43 should be positioned so that when one vertical stop surface of the pressure block 35 is held against one limit stop, the clearance between the other vertical stop surface of the pressure block and other limit stop is equal to the travel.

The total pressure block movement needs only to be ¼ or ½ inch from fully closed. "Fully closed" means contours 38 of the block are brought in alignment with the liners 18 and 19. Movement can be continuous (with infinite positions) between vertical stops or it can be stepwise with a position at pre-selected discrete intervals, e.g., every 0.005 inch (i.e., of block travel). The pressure block can cooperate with either of the compound section structures 31, 32 (FIGURE 1, 2) or 31', 32' (FIGURE 5).

As seen in FIGURE 1, the right hand surface of the block 43 cooperates wtih a non-twisting guide surface 44 which comprises the vertical shoulder formed from the flange when milling out the portion thereof as above described. A stem 37 extends from the aforementioned structure of the pressure block and serves as a member which contacts the hereinafter described actuating and positioning means to transmit motion and power to the pressure block. It is preferred that the stem be integral with the rest of the pressure block structure so that no errors in positioning the pressure block 35 will occur due to vibration shaking loose a stem which is bolted or screwed to the rest of the pressure block.

After the rubber has passed through the constriction formed by the cooperation of the pressure block and the compounding section 31 and 32 of the worms, it is delivered into a release chamber that is defined by the casing 45. Due to a substantial pressure difference between the compound section and this release chamber, moisture and other volatiles can flash to a vaporous or gaseous state and be vented from the rubber. The portion of the worm disposed through the release chamber comprises a means for kneading the rubber to expose it sufficiently to release gases trapped within the plastic mass of the rubber as it appears immediately downstream of the compound section.

Through this release chamber the feed is preferably slow, carrying the hot treated material forward by the forward feed flights 46, 47 (as disposed in 45 these define the extruder mill section) of worms 22, 23, kneading it and constantly exposing new surfaces for the release of violatiles, and delivering the material to the auxiliary fight 48 and main discharge flight 49 running in the outlet ends of barrels 16, 17. These discharge flights are at much faster pitch and the barrel 16 terminating short at the end wall 50 causes the material of auxiliary flight 48 to transfer laterally over to main extruder flight 49 delivering the material to the extruder die or die plate 52 forming the flow into any desired cross sectional shape, such as a cyclindrical shape. Fights 48 and 49 define the extrusion section of the extruder.

Positioned immediately downstream of the die 52 is a pelletizing unit 55 (FIGURES 1 and 3) that chops the extrudate into small crumbs. The pelletizing unit comprises a blade 56 and a motor 57 driving it. The motor can be connected to the driving blade through a coupling, a gear box, a clutch or other power transmission means shown as 58. In operation, the pelletizing unit moves the blade 56 past the extrusion die 52 in such a manner as to avoid metal to metal contact between the blade and the die. This requires careful adjustment in the positioning of the pelletizing unit. A 0.005 inch clearance between the blade and the die plate when the machine is hot has been found satisfactory. Because of the high temperatures at which the extruder-dryer operates, it is best to make this adjustment when the machine is cold.

After passing through the pelletizing unit 55, the crumb, i.e., the extrudate or product, is delivered to a conveying apparatus such as the belt 60 which serves to deliver the crumb to weighing, baling, and packaging apparatus.

The worm assemblies 22 and 23 are rotated by a motor 65 which delivers power to them through a transmission (i.e. coupling, gear box, and/or clutch) 66. Preferably, for ease of the measurement of power input into the extruder dryer, the motor is an electric motor, and in large sized apparatus (e.g. 6 inch extruder barrels) should be a three phase induction motor operating on alternating current. In a preferred embodiment the transmission 66 should be designed to provide an output rotary speed of 300 r.p.m. of the worm assemblies. Electric power is delivered to the motor 65 through a plurality of leads 67.

The operation of the extruder in mechanically working rubber or other plastic materials fed thereto should be apparent from the above. Rubber is fed in through the feed opening 28, is masticated, plasticized, pressurized and heated both by steam jacketing and by the mechanical working thereof in the feed section as the rubber moves from the feed opening to the compound section by being fed forwardly along the worms 29 and 30. In the feed section, moisture is squeezed out and travels countercurrently thereto to the fines section 33 from whence it is withdrawn and directed to storage or disposal. The material is then subjected to the unique action in passing through the constriction in the compound section. The rubber is then delivered to the milling section of the screws and release chamber 45 wherein moisture and other volatiles flash out of mixture with the rubber and wherein the rubber is kneaded to expose the maximum amount of it to the lower pressures existing in the release chamber so that entrapped volatiles that desire to flash can be vented from the rubbery mass. The rubber then passes from the mill section into an extrusion section where it is subjected to a pressurizing action and is extruded. The extrudate is pelletized in the extruder die 52 and pelletizing unit 55, respectively. The system for controlling certain properties of the extrudate will now be described.

To state our invention in its simplest terms, but without any intention whatsoever of being limited to the specific embodiments illustrated, described and pointed out below, an automatic control system constructed according to our invention for an extruder dryer comprises a secondary feedback control loop that embodies a watt-meter (for measuring power consumption) controller which provides a control signal to an electrohydraulic valve motor which responds thereto by adjusting the position of the pressure block and a primary feedback control loop that embodies an extrudate temperature (for measuring rubber dryness) controller which provides a control signal (representative of power demand) to manipulate the set point of the secondary (watt-meter) control loop. This is an example of a multiloop or cascade control configuration.

Both the primary and secondary control loops operate about their respective set points. The set point for the primary loop is manually set into a temperature recorder controller. This set point remains undisturbed until another manual adjustment is made by the operator. On the other hand, the secondary feedback control loop, while it has a set point, has a set point that is varied in accordance with the output signals from the primary feedback control loop. Thus, the set point of the secondary control loop is in reality an instantaneous value. In order to distinguish the manual set point of the primary control loop from the instantaneous value set point of the secondary control loop, the latter will be termed the "preset value" in order to avoid any confusion due to the language employed in describing the respective set points.

It will thus be seen that the result of the cooperation between the two control loops is that the secondary control loop brings about pressure block position adjustment in accordance with both the power actually consumed by the apparatus and also in accordance with the power demanded by the temperature measurement of the product, e.g., the crumb or extrudate. It is to be understood that when we employ the term "preset value," that this term also incorporates the feature of set point adjustment of the secondary feedback control loop in accordance with the control signal representative of power demand (produced by the extrudate temperature measurement).

The watt-meter control loop adjusts the position of the pressure block 35 in accordance with the power consumed by the motor 65 and the power demanded by the extrudate temperature controller. A means for measuring the power consumed by the motor and for establishing a first signal representative of the power consumed is shown as the apparatus 70. The means 70 may comprise a thermal converter such as is described in the "Standard Handbook for Electrical Engineers" published in 1941 by McGraw-Hill on page 155 in section 3–163. A thermal converter is preferred because it has an inherent time lag and for that reason will avoid hunting of this control system, i.e., continuous re-positioning of the pressure block in response to instantaneous variations in the power consumption. Other apparatus, such as described on pages 8–63 and 8–64 of "Process Instruments and Controls Handbook" (hereinafter "controls") published by McGraw-Hill Book Company in 1957, may also be employed. However, these latter means require careful mounting with suitable vibration isolation means. In any event, the means 70 is disposed on the power leads 67 to the motor (assuming an electrical motor), measures the watts consumed by the motor, and produces therefrom an output signal that is representative of the wattage consumed. Where a thermal converter is employed for the means 70, a direct current (D.C.) signal is produced, the magnitude of which is representative of the wattage consumed by the motor 65. The output signal from the means 70 is transmitted through appropriate leads 71 to a converter 72 where the D.C. signal is converted to alternating current (A.C.). The use of the converter 72 is optional and can be eliminated when the thermal converter or other power measuring means produces an A.C. signal. It can be also eliminated when the wattmeter controller apparatus hereinafter described can operate from a D.C. signal such as provided by the thermal converter. Of course, should an A.C. signal be produced by the means 70 it may be necessary to provide a rectifier 72 should the wattmeter controller hereinafter described require a D.C. signal at its input.

The output signal from the converter 72, or from the means 70 if no convertor is needed, is transmitted through a lead (or leads) 73 to the power recorder 74. This instrument is conventional and serves to record the power consumed by the motor 65. The signal is also transmitted to a means 75 for receiving the signal produced by 70 (or 72, as noted above) and establishing therefrom a first control signal (i.e., first error signal) that represents the variation of the signal received through 73 from a "preset value." The means 75 may comprise an electric controller having proportional plus integral (or automatic reset) control action and may be of the type of electrical controller described on pages 9–48 through 9–78 of "Controls." The action of this controller in establishing a control signal comprises comparing the signal received through the chain of elements 70—74 with the instantaneous set point ("preset value") within the controller 75, which set point is obtained from temperature recorder controller 88 (hereinafter described) in the primary loop. This act of comparison comprises the signal received from the control chain 70 through 74 being subtracted from the set point. This act of subtraction establishes an error signal from which the proportional and integral control actions of the controller 75 provide a control signal capable of diminishing this error to zero.

The control signal obtained in controller 75 is then transmitted through the leads 76 to a means 80 for adjusting the pressure block 35. Preferably, the means 80 comprises an electro-hydraulic valve motor which may be selected from the valve positioning apparatus described in volume 29 (October 1956) of Instruments and Automation, in the article beginning on page 1986 entitled "Positioners For Cylinder Actuators" by C. S. Beard. An electrohydraulic valve motor is preferred because it provides the precision adjustment required in this service and it also provides the extreme amount of force required to move the pressure block toward the screw assembly 23 under the conditions of extreme pressure that exist in the compound section in the reverse flight 31 and 32 of the screws. In small extruders it may be possible to avoid having to employ hydraulic means, e.g., by using a pneumatic operator, but in large machines such as those having 6 inch diameter screws and liners it has been found that an electrohydraulic valve motor is required. Electrohydraulic actuators are also briefly described on page 10–57 of "Controls." Electric actuators which may be suitable for employment in control systems for small caliber extruders may comprise such electric actuators as are described in pages 10–44 through 10–57 of "Controls." The electrohydraulic valve motor 80 is provided with a sump 81 having suitable supply and return connections to 80 for hydraulic fluid.

The valve motor includes a positioning element 82 extending therefrom through a guide means 83 into kinematic contact with the stem 37 that extends up from the pressure block 35. The stem 37 is guided by, and the guide means 83 is supported by, a support and stem guide bracket member 84 which is bolted to the barrels of the machine. Suitable additional support means for the electrohydraulic motor 80 are not shown for the sake of clarity, but are also part of the bracket 84.

The rest of the control system according to our invention is designed to change the value of the set point of the secondary (wattmeter) loop, i.e., to change the "preset value" of the controller 75. This is accomplished by measuring the temperature at a point within the extruder die 52 or, if possible, at a point downstream of the die, producing a control (i.e., error) signal therefrom, and manipulating the set point of controller 75 responsive to the temperature signal. It is preferred that this temperature be measured as far downstream as is structurally possible in the extrusion die 52, and in some instances to measure the rubber extrudate temperature after it has passed through the extrusion die but before it is operated on by the pelletizer unit. When the temperature is measured downstream of the extrusion die 52, an advantage is gained because there is some slight flashing of moisture and other volatiles immediately upon (or following) extrusion. In any event, it is mandatory that the temperature that is measured be taken downstream of the compound section (where intense heating occurs) and preferably downstream of the mill section (where intense flashing occurs) in order to assure that the temperature is being measured at a point where an opportunity has been given for the moisture and other volatiles to flash or otherwise be removed from the rubber being processed in the extruder.

The said temperature is measured by providing, in the extrusion die 52, a thermocouple well 85 in which is disposed a thermocouple 86 which latter is preferably iron-constantan or copper-constantan. The thermocouple leads 87 deliver their signal to a conventional temperature recorder controller 88 which records the temperature and which serves as a means for establishing a control (i.e., a second error) signal that represents the variation of the temperature or the temperature signal from a manual set point 90. The recorder controller 88 comprises an apparatus suitable for receiving an electrical input signal from the thermocouple leads 87 and for providing an electrical output signal (termed an error signal or temperature signal) that is suitable for automatically changing the "preset value" in the controller 75. In a preferred embodiment, the controller 88 provides proportional plus integral plus derivative action. Where operating conditions do not favor the employment of a controller with derivative action, it is preferred to employ a controller 88 having proportional plus integral actions therein. Electric controllers of these types of controller 88 and of controller 75 are described in chapter 9 of "Controls."

The temperature signal generated in the controller portion of 88 is then transmitted through a lead or leads 89 to an error detector which comprises a portion of the controller 75 that is an apparatus for automatically manipulating the value of the set point in the controller 75 (i.e., changes the "preset value" of 75) in response to the temperature control signal.

In the practice of our invention, it is to be stressed and particularly noted that data must be obtained on the following parameters: the type of rubber, i.e., its recipe, rate of feed of rubber, the power consumed at such rate, the resulting temperature generated at the point of measurement when producing a rubber having a satisfactory moisture content, and the pressure block position. These data must be obtained by actual experiments for the particular type of rubber. The settings required of the various controllers are derived from such data. It should be noted that each type of rubber will require a different amount of power, generate a different temperature when sufficiently dry and free of volatiles and moisture and may even require a different pressure block setting. Therefore, this data must be accumulated by routine experiments prior to putting the automatic control system of our invention on stream. The following is typical data obtained in the milling of styrene-butadiene rubber: 6″ barrel diameter extrusion dryer, 300 r.p.m.; 500 h.p.: 24:1 LD; 5.928″ dia. x 1.5″ (no reverse-flight) compounders; 5.450 increasing to 5.550″ root dia. mill worms.

| Run | 1 | 2 | 3 | 4 | 5 | 6 | 7 |
|---|---|---|---|---|---|---|---|
| Feed rate lb./hr | 3,150 | 2,800 | 3,500 | 3,200 | 2,500 | 2,750 | 3,500 |
| Percent H₂O by weight in feed (wet basis) | 35 | 35 | 38 | 35 | 40 | 35 | 37 |
| Feed temp. (° F.) | 125 | 125 | 120 | 125 | 125 | 125 | 120 |
| Pressure block position (inches) (above fully closed) | 0.025 | 0.020 | 0.025 | 0.020 | 0.020 | 0.020 | 0.030 |
| Drive Hp | 335 | 290 | 335 | 350 | 255 | 285 | 360 |
| Die plate temp. (° F.) | 342 | 345 | 350 | 347 | 335 | 339 | 340 |
| Baled rubber,¹ temp. (° F.)² | 185 | 187 | 190 | 190 | 180 | 182 | 180 |
| Wt. percent H₂O³ in baled rubber¹ | 0.25 | 0.21 | 0.19 | 0.17 | 0.60 | 0.38 | 0.30 |

¹ Baled rubber is defined as a compressed mass of extrudate, formed into a body (bale) weighing 74 to 75 pounds and about 14″ x 28″ x 7½″.
² Baled rubber temperature was determined by inserting a thermometer into the bale.
³ Baled rubber moisture content was determined by drying samples to 0% moisture by milling them between hot rollers and measuring the weight loss, then converting said loss to weight percent.

The feed, compound and mill sections of the extruder were heated during the above runs with 300 p.s.i.g. steam. The extrusion section was cooled with water. In the machine tested, provision was also made for cooling the mill section by shutting off the steam and running water therethrough.

Rubber prepared from emulsion polymerization at 41° F. and at a conversion of 60 percent of the following recipe was employed in the above tests:

| | Parts by weight |
|---|---|
| Butadiene | 75 |
| Styrene | 25 |
| Water | 180 |
| Rosin soap, K salt | 4.5 |
| Tamol N¹ | 0.15 |
| $Na_3PO_4 \cdot 12H_2O$ | 0.80 |
| Para-menthane hydroperoxide | 0.12 |
| $FeSO_4 \cdot 7H_2O$ | 0.20 |
| $K_2P_4O_7$ | 0.30 |
| Tert-dodecylmercaptan | 0.20 |
| Shortstop² | 0.20 |
| Anti-oxidant³ (based on rubber) | 1.25 |

¹ Sodium salt of a naphthalene sulfonic acid condensed with formaldehyde.
² 2:1 weight ratio mixture of sodium dimethyldithiocarbamate and sodium polysulfide.
³ Diphenylamine-acetone reaction product.

It is believed that the operation of our control system should be apparent from the foregoing description. Nevertheless, for further elucidation the following operating procedure is set forth. First, operating data for the various parameters as set forth above is obtained for the materials to be processed in the extrusion dryer. Then the power consumption for a desired feed rate and moisture content of the product is taken as the "preset value" for the controller 75 (i.e., the set point of 75). Similarly, the temperature for this condition is set into the controller 88 as its set point 90. Rubber of the type for which the data was obtained is then fed through the feed opening 28 into the extruder dryer at the rate for which the set point data was obtained. Should the power consumption of motor 65 decrease, the wattmeter control loop will detect this condition and will operate in order to increase the constriction in the compound section by causing the valve motor 80 to move the pressure block 35 towards the screw in order to reduce the radial clearance between the reverse flight screws 31 and 32 and the pressure block. An opposite action occurs as power consumption goes up. Then, suppose the thermocouple 86 detects too low a temperature in the extruder die. This condition means that the product will be too wet since there will not be sufficient heat to vaporize the moisture in the rubber. The controller 88 establishes a control signal that represents the variation of this temperature from the set point of the controller and applies this control signal to controller 75 to change the "preset value" of the set point in controller 75. In other words, the temperature controller manipulates the set point of the wattmeter control loop. This action will have the results of also decreasing the radial clearance between the reverse flight screws 31 and 32 and the pressure block 35 because the wattmeter controller 75 will then provide a signal to the electrohydraulic operator 80 to accomplish this. An opposite action occurs should the temperature of the extruder die increase above the set point of the controller 88.

Although we have demonstrated our invention with respect to a preferred electrical control system, it is to be understood that pneumatic systems may also be used, provided their accuracy, response, and other characteristics are suitable for the particular installation. Also, while we have illustrated and described our invention with respect to a process and apparatus each of which practices measuring temperature in the primary loop, it is to be understood that other physical properties that correlate with the moisture content of the extrudate can also be measured and utilized in the primary loop to bring about control, dielectric constant being such a property.

Another modification within the scope of our invention is to use a plurality of thermocouples, preferably three, disposed in the die plate as our means for measuring temperature. We prefer to connect the thermocouples in parallel so that a fail-safe means is provided so that if one of the thermocouples fails completely or is taken out of service, the voltage measurement (which is correlated with temperature) does not change. Design features, factors to be considered, etc., for both series and parallel thermocouple circuits are set forth in chapter 2 of "Controls."

Other temperature measuring means, e.g., radiation pyrometers, may be employed, but thermocouples are preferred by reason of the ease of installing, calibrating, and replacing them.

Still another modification is to employ grooved liners in the feed section. The advantage obtained by this is to increase the through-put, i.e., the feed rate, of the extruder-dryer. This feature comprises machining liners 18 and 19 to provide a plurality of axial grooves of rectangular cross-section, e.g., about ¼ inch radially by about ¾ inch circumferentially in a 6 inch diameter. From four to ten grooves may be employed. With this modification, feed rates were obtained in the range from 3800 to 4000 lb./hr. of the rubber described in the above recipe.

While we have described our invention with respect to certain specific embodiments, it is to be understood that we do not limit ourselves in practice to the specific embodiments but include as our invention all the equivalents thereof which would be obvious to one skilled in the art.

We claim:

1. A method of controlling the producing of an extrudate wherein a material is fed through a feeding zone wherein it is masticated, plasticized and subjected to an increasing pressure as it passes therethrough, is forced out of said feeding zone through a first constriction to a low pressure milling zone, is delivered from said milling zone to an extrusion zone; and is forced out of said extrusion zone through a second constriction; said control method comprising measuring the power consumed in passing the material through said feeding zone, first constriction, milling zone, extrusion zone and second constriction to obtain a first signal representative of said consumed power, and adjusting said first constriction responsive to variation of said first signal from a "preset value."

2. A method of control according to claim 1 and further including the improvements of measuring the temperature of the material downstream of said first constriction to form a temperature-representative signal; and changing said "preset value" responsive to variation of said temperature-representative signal from a set point.

3. Apparatus for controlling the operation of an extruder that includes a barrel, a worm rotatably supported within the barrel and having a compound section upstream of an extrusion section, pressure block means movably supported by said barrel adjacent said worm compound section for coaction therewith to form a constriction in the path of material fed along said worm, an extrusion die supported by said barrel downstream of said pressure block and adjacent said worm extrusion section, and power means to rotate said worm; said apparatus comprising, in combination, means for measuring the power consumed by said power means to establish a first signal representative of the power consumed; means connected to said means for measuring for receiving a first signal therefrom and establishing a first control signal that represents the variation of said first signal from a "preset value"; and means, connected between said pressure block means and said means for receiving and establishing, for adjusting said pressure block means to change the constriction in response to said first control signal; means disposed in said die for measuring temperature and producing a second signal representative thereof; means connected to said means for measuring temperature for receiving said second signal and establishing another control signal that represents the variation of said second signal from a set point; and means connected to receive said another control signal and to apply it to said means for establishing a control signal, for changing said "preset value" responsive to said another control signal.

4. Apparatus for controlling the operation of an extruder that includes a barrel, a worm rotatably supported within the barrel and having a compound section, pressure block means movably supported by said barrel adjacent said worm compound section for coaction therewith to form a constriction in the path of material fed along said worm, and power means to rotate said worm; said apparatus comprising, in combination, means for measuring the power consumed by said power means to establish a first signal representative of the power consumed; means connected to said means for measuring for receiving a first signal therefrom and establishing a control signal that represents the variation of said first signal rfom a "preset value"; and means, connected between said pressure block means and said means for receiving and establishing, for adjusting said pressure block means to change the constriction in response to said control signal.

5. Apparatus for controlling the position of a pressure block in an extruder that is powered by a motor, said apparatus comprising in combination, means for measuring the power consumed by the motor and establishing a signal representative of the power consumed; means supported in kinematic connection with the pressure block to position the pressure block in response to a control signal; and means, connected between both of said means, for receiving said signal, comparing it with a "preset value," producing said control signal, and applying said control signal to the second said means.

6. Apparatus for controlling the position of a pressure block in an extruder that has a feed section upstream of an extrusion section, the latter section including an extrusion die, a compound section disposed between said feed and extrusion sections wherein said pressure block is movably supported, and a motor to operate said extruder, said appartaus comprising, in combination, means for measuring the power consumed by the motor and establishing a signal representative of the power consumed; means supported in kinematic connection with the pressure block to position the pressure block in response to a control signal; means connected between both said means for receiving said signal, comparing it with a "preset value," producing said control signal, and applying said control signal to the second said means; means disposed in said die for measuring temperature and producing a second signal representative thereof; means connected to said means for measuring temperature for receiving said second signal and establishing another control signal that represents the variation of said second signal from a set point; and means connected to receive said another control signal and to apply it to said means for producing a control signal, to change said "preset value" responsive to said another control signal.

7. Apparatus according to claim 6 wherein said means disposed in said die for measuring temperature comprises a thermocouple.

8. Apparatus according to claim 6 wherein said means for establishing another control signal comprises a recorder-controller.

9. Apparatus according to claim 6 wherein said means for measuring power comprises a thermal convertor.

10. Apparatus according to claim 6 wherein said means for producing said control signal comprises a recorder-controller.

11. A method of controlling the pressure block adjustment in an extruder that includes a barrel, a worm rotatably supported within the barrel and having a compound section and an extrusion section, pressure block means movably supported adjacent said worm compound section for coaction therewith to form a constriction in the path of material fed along said worm, an extrusion die supported by said barrel downstream of said pressure block and adjacent said worm extrusion section, and power means to rotate said worm; said control method comprising the steps of measuring the power consumed by said power means and establishing a first signal representative of the power consumed; comparing said first signal with a "preset value" and establishing a control signal representative of the variation of said first signal from said "preset value"; applying said control signal to said pressure block and adjusting said pressure block responsive to said control signal; measuring a temperature at the extrusion die and establishing a second signal representative of the temperature; comparing said second signal with a set point and producing another control signal that is representative of variation of said second signal from said set point; and adjusting said "preset value" responsive to said another control signal.

12. A method of controlling the mechanical working of a plastic material wherein said plastic material is fed to a constriction and subjected to an increased pressure upstream of said constriction, and is forced through said constriction into a zone of low pressure; said control method comprising measuring the amount of power consumed in said steps of feeding and forcing and forming a first input signal representative of said amount of power; comparing said first input signal with a control point signal of a "preset value" to form an error signal; adjusting the constriction responsive to said error signal; measuring the temperature of said material downstream of said constriction and forming a second input signal representative of said temperature; comparing said second input signal with a set point signal to form a second error signal; and changing said control point signal responsive to said second error signal.

13. A method of controlling the mechanical working of a plastic material wherein said plastic material is fed to a first constriction and subjected to an increased pressure upstream of said first constriction, is forced through said first constriction into a zone of low pressure, and is forced through a second constriction; said control method comprising measuring the amount of power consumed in both said steps of forcing and said feeding step and forming a first input signal representative of said amount of power; comparing said first input signal with a control point signal of a "preset value" to form an error signal; adjusting said first constriction responsive to said error signal; measuring the temperature of said material downstream of said constriction and forming a second input signal representative of said temperature; comparing said second input signal with a set point signal to form a second error signal; and changing said control point signal responsive to said second error signal.

14. A method of controlling the mechanical working of a plastic material wherein said plastic material is fed to a constriction and subjected to an increased pressure upstream of said constriction, and is forced through said constriction into a zone of low pressure; said control method comprising measuring the amount of power consumed in said steps of feeding and forcing; forming a first input signal representative of said consumed power; adjusting the constriction responsive to variation of said first input signal from a "preset value"; measuring a property of said plastic material that correlates with its moisture content downstream of said constriction and forming a second input signal representative of said property; and changing said "preset value" responsive to variation of said second input signal from a set point.

15. A method of controlling the mechanical working of a plastic material wherein said plastic material is fed to a constriction and subjected to an increased pressure upstream of said constriction, and is forced through said constriction into a zone of low pressure; said control method comprising measuring the amount of power consumed in said feeding and forcing steps to form a first input signal that is representative of said consumed power; comparing said first input signal with a control point signal of a "preset value" to form an error signal; and adjusting the constriction responsive to said error signal.

References Cited in the file of this patent

UNITED STATES PATENTS

| Re. 23,948 | Fuller | Feb. 15, 1955 |
| 2,663,901 | Hale et al. | Dec. 29, 1953 |
| 2,726,922 | Merrill et al. | Dec. 13, 1955 |
| 2,916,792 | Crook et al. | Dec. 15, 1959 |

FOREIGN PATENTS

| 147,971 | Australia | Aug. 29, 1952 |